United States Patent [19]
Gullo et al.

[11] Patent Number: 5,643,477
[45] Date of Patent: Jul. 1, 1997

[54] LASER ENCLOSURE

[75] Inventors: Christopher Thomas Gullo, Centerville; Stephen James Bolin, Troy, both of Ohio; James Stanley Kaczmarek, Farmington Hills, Mich.

[73] Assignee: Motoman Inc., West Carrollton, Ohio

[21] Appl. No.: 497,468

[22] Filed: Jun. 30, 1995

[51] Int. Cl.$^6$ .................................................. B23K 26/12
[52] U.S. Cl. ................................. 219/121.86; 219/121.6; 219/121.82; 52/32; 52/64
[58] Field of Search .......................... 219/121.21, 121.22, 219/121.6, 121.82, 121.86; 52/29, 32, 64; 312/249.2, 249.7, 315, 5

[56] References Cited

U.S. PATENT DOCUMENTS

| | | |
|---|---|---|
| 3,775,586 | 11/1973 | Flint et al. |
| 4,205,216 | 5/1980 | Douglas . |
| 4,575,610 | 3/1986 | Gavin ................................... 219/121.6 |
| 4,617,446 | 10/1986 | Anderson . |
| 4,659,990 | 4/1987 | Swensrud et al. . |
| 4,686,877 | 8/1987 | Jaritz et al. ................................. 83/177 |
| 4,730,113 | 3/1988 | Edwards et al. .................... 219/121.83 |
| 4,884,189 | 11/1989 | Kimura et al. ...................... 364/474.31 |
| 5,090,288 | 2/1992 | Pelzer ........................................ 83/177 |
| 5,181,898 | 1/1993 | Piotrowski . |
| 5,183,993 | 2/1993 | Sato et al. ............................. 219/121.82 |
| 5,265,497 | 11/1993 | Curless ........................................ 74/608 |
| 5,274,212 | 12/1993 | Campbell et al. .................. 219/121.86 |
| 5,464,963 | 11/1995 | Hostler et al. ....................... 219/121.82 |

FOREIGN PATENT DOCUMENTS

| | | |
|---|---|---|
| 2614477 | 4/1987 | France . |
| 639170 | 1/1988 | Japan . |

OTHER PUBLICATIONS

Vasilash G., "An Exclusive Look: Motoman's Laser World: . . . ", Reprinted from *Production* Magazine, Jul. 1992.

*Primary Examiner*—Teresa J. Walberg
*Assistant Examiner*—Gregory C. Motts
*Attorney, Agent, or Firm*—Killworth, Gottman, Hagan & Schaeff, L.L.P.

[57] ABSTRACT

A laser enclosure is provided comprising a housing having an inner cavity in which laser operations are performed. The housing includes a first section having a first opening through which workpieces pass into and out of the inner cavity. Further provided is a first workpiece positioner for alternately moving the workpieces from a first workpiece loading/unloading zone, through the first opening to a first work zone within the inner cavity of the housing. The first workpiece positioner includes a first workpiece holder adapted to releasably receive at least one of the workpieces and is movable from the first workpiece loading/unloading zone to the first work zone as the first positioner moves from a first loading/unloading position to a first work position. The first positioner further includes a first sealing panel which sealingly mates with a first sealing portion of the first section of the housing when the first workpiece holder is located in the first workpiece loading/unloading zone and a second sealing panel which sealingly mates with a second sealing portion of the first section of the housing when the first workpiece holder is located in the first work zone.

20 Claims, 10 Drawing Sheets

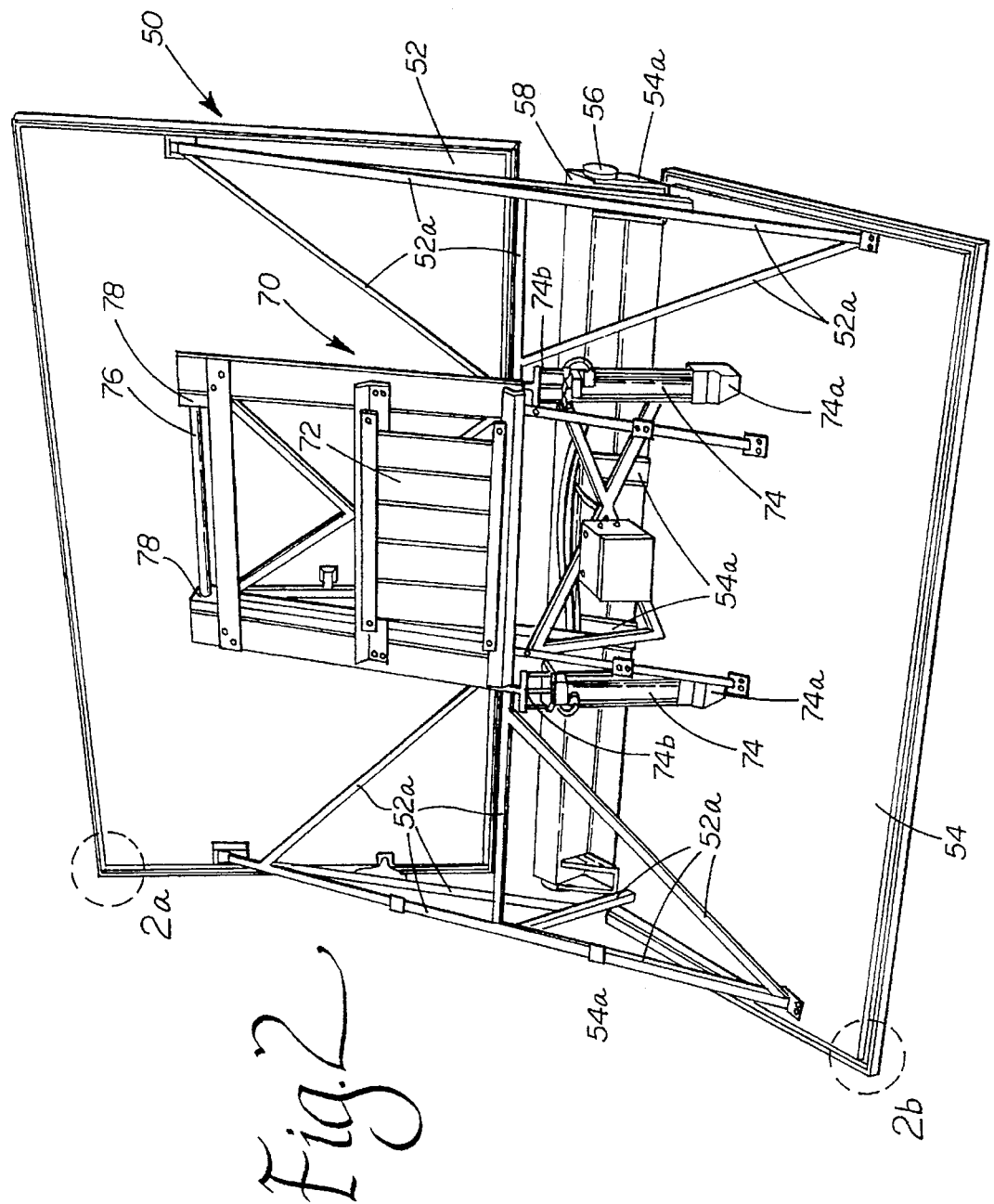

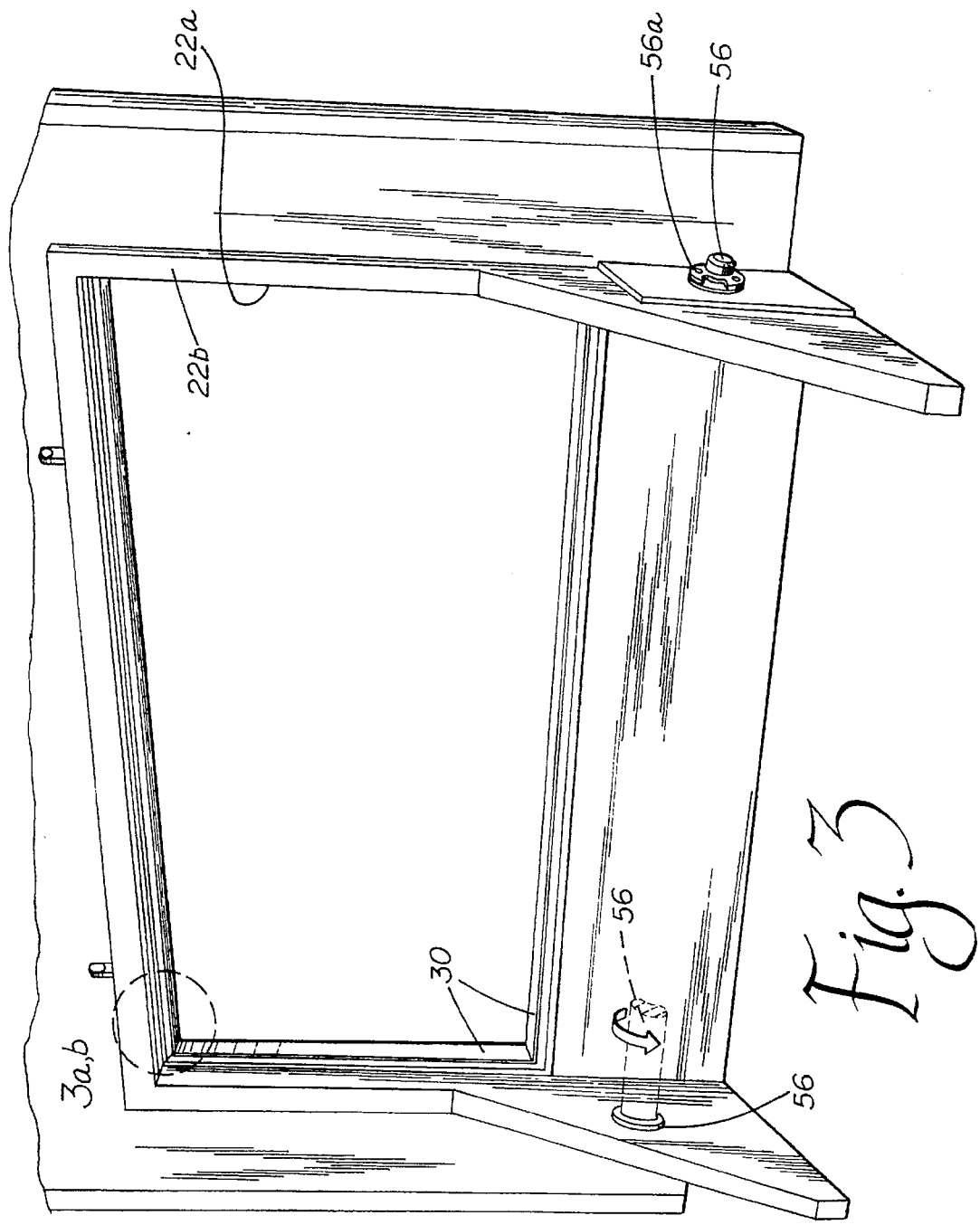

LASER ENCLOSURE

BACKGROUND OF THE INVENTION

The present invention relates in general to laser enclosures and, more particularly, to such an enclosure having at least one workpiece positioner for alternately moving workpieces from a workpiece loading/unloading zone, through an opening in the enclosure housing to a work zone within the housing and for sealingly mating with the housing to prevent laser energy from exiting the housing during a laser operation.

Industrial lasers are known in the prior art. Such lasers are commonly used for purposes of welding and cutting. U.S. and international standards have been developed which divide all industrial lasers into four major hazard categories, i.e., four broad classes (I to IV). The weakest lasers are Class I lasers which emit laser radiation below known hazard levels. The strongest lasers are Class IV lasers which are hazardous to view under any condition (directly or diffusely scattered) and are a potential fire hazard and a skin hazard.

Laser enclosures are also known in the prior art. Such enclosures are commonly used as protective enclosures for higher powered lasers, e.g., Class II, Class III or Class IV lasers, and allow the higher powered lasers to operate in a lower classification. For example, some Class I industrial lasers consist of a higher class laser enclosed in a properly interlocked and labeled protective enclosure.

One laser enclosure found in the prior art encases a laser workstation. Associated with the workstation is a laser device which acts to generate and direct a laser beam to the workstation for performing laser operations upon workpieces that pass into the enclosure.

The noted laser enclosure comprises three stationary walls, a stationary ceiling and a fourth stationary wall having an opening through which workpieces pass into and out of the inner cavity of the enclosure. The enclosure includes a rotary turntable having four vertical partitions that attach to a hub at the turntable's center of rotation, which is coplanar with the fourth stationary wall. Positioned between the four vertical partitions are four fixtures for mounting workpieces onto the rotary turntable.

Portions of two of the vertical partitions are sealed to a portion of the fourth stationary wall by hinged flaps to inhibit the escape of laser radiation from the enclosure. Those flaps are moved between sealing and non-sealing positions by a plurality of pneumatic cylinders. Operation of the cylinders is time consuming, resulting in an undesirable pause occurring between laser operations. Accordingly, this active sealing arrangement is a substantial limitation on welding efficiency, especially where a series of successive workpieces is to be welded. Furthermore, since this sealing arrangement requires movable sealing flaps, i.e., non-static sealing members to effect sealing, it is complex and costly to produce.

U.S. Pat. No. 4,205,216 to Douglas discloses a laser enclosure comprising a plurality of stationary walls, a stationary ceiling and a front stationary wall having an opening through which workpieces pass into and out of the inner cavity of the enclosure. The enclosure includes a rotary turntable having a plurality of vertical baffles that extend to a hub at the turntable's center of rotation. Positioned between the vertical baffles are fixtures for mounting workpieces onto the rotary turntable. This enclosure is provided with only a single workpiece transport device, namely, the rotary turntable. The overall processing time required for welding a given number of workpieces with this apparatus can be decreased by, for example, decreasing the time required to index the single rotary turntable one position. This, however, is oftentimes problematic to accomplish when larger workpieces are involved due to the size and weight of the workpieces as well as the size and weight of the turntable required to support such workpieces.

Accordingly, there is a need for an improved laser enclosure which achieves sealing without requiring active drive devices or complex movable sealing members. There is further a need for an improved laser enclosure which can quickly and efficiently move large workpieces into and out of the interior of the enclosure housing, thereby reducing the overall processing time for a given number of such workpieces.

SUMMARY OF THE INVENTION

The laser enclosure of the present invention is believed to meet these needs. The laser enclosure of the present invention may be used, for example, to encase a Class IV laser to allow it to operate as a Class I laser. The protective enclosure includes a housing having a first section with a first opening through which workpieces pass into and out of an inner cavity of the housing. Additionally provided is a first workpiece positioner for alternately moving workpieces from a first workpiece loading/unloading zone, through the first opening in the housing to a first work zone within the inner cavity of the housing. Also provided is a second workpiece positioner for alternately moving workpieces from a second workpiece loading/unloading zone, through a second opening in the housing to a second work zone within the inner cavity of the housing. Each workpiece positioner includes two sealing panels which act to sealingly engage a static sealing structure so as to inhibit the escape of laser energy from the housing during laser operations.

In accordance with a first aspect of the present invention, a laser enclosure is provided comprising a housing having an inner cavity in which laser operations are capable of being performed. The housing includes a first section having a first opening through which workpieces pass into and out of the inner cavity. Further provided is a first workpiece positioner for alternately moving the workpieces from a first workpiece loading/unloading zone, through the first opening to a first work zone within the inner cavity of the housing. The first workpiece positioner includes a first workpiece holder adapted to releasably receive at least one of the workpieces and is movable from the first workpiece loading/unloading zone to the first work zone as the first positioner moves from a first loading/unloading position to a first work position. The first positioner further includes a first sealing panel which sealingly mates with a first sealing portion of the first section of the housing when the first workpiece holder is located in the first workpiece loading/unloading zone and a second sealing panel which sealingly mates with a second sealing portion of the first section of the housing when the first workpiece holder is located in the first work zone.

The first section may comprise a first generally vertical wall having the first opening therein. The housing may further comprise second, third and fourth generally vertical walls, and a ceiling connected to the first, second, third and fourth walls.

The first section of the housing includes first sealing structure which circumscribes the first opening. The first sealing structure has a first inner surface which defines the first sealing portion and a first outer surface which defines the second sealing portion.

The first workpiece positioner further includes a first rotatable shaft. The first and second sealing panels are fixedly attached to the first rotatable shaft for rotation therewith.

The first and second panels are preferably separated from one another by an angle of approximately 120°. The first workpiece positioner further includes a drive device associated with the first shaft for effecting rotation of the first shaft back and forth through an angle of approximately 120° such that the first positioner moves through an angle of approximately 120° as it moves back and forth between its first loading/unloading position and its first work position.

The first workpiece holder is fixedly positioned between the first and second panels. The first workpiece holder may comprise a first workpiece fixture and a first displacement device for moving the first workpiece fixture relative to the second panel.

The housing further includes a second section having a second opening through which workpieces pass into and out of the inner cavity. The enclosure may further include a second workpiece positioner for alternately moving workpieces from a second workpiece loading/unloading zone, through the second opening to a second work zone within the inner cavity. The second workpiece positioner includes a second workpiece holder adapted to releasably receive at least one of the workpieces and is movable from the second workpiece loading/unloading zone to the second work zone as the second positioner moves from a second loading/ unloading position to a second work position. The second positioner further includes a third sealing panel which sealingly mates with a third sealing portion of the second section when the second workpiece holder is located in the second workpiece loading/unloading zone and a fourth sealing panel which sealingly mates with a fourth sealing portion of the second section when the second workpiece holder is located in the second work zone.

The second section includes second sealing structure which circumscribes the second opening. The second sealing structure has a second inner surface which defines the third sealing portion and a second outer surface which defines the fourth sealing portion.

The second workpiece positioner further includes a second rotatable shaft. The third and fourth sealing panels are fixedly attached to the second rotatable shaft for rotation with the second rotatable shaft. The third and fourth panels are preferably separated from one another by an angle of approximately 120°.

In accordance with a second aspect of the present invention, a laser system is provided comprising a generator for generating a laser beam and directing the laser beam onto a workpiece located in a work zone and a housing having an inner cavity and including a first section provided with a first opening through which workpieces pass into and out of the inner cavity. Further provided is a first workpiece positioner for alternately moving the workpieces from a first workpiece loading/unloading zone, through the first opening to a first work zone within the inner cavity. The first workpiece positioner includes a first workpiece holder adapted to releasably receive at least one of the workpieces. The first workpiece holder is movable between the first workpiece loading/unloading zone and the first work zone as the first positioner moves between a first loading/unloading position and a first work position. The first positioner further includes a first sealing panel which sealingly mates with a first sealing portion of the first section when the first workpiece holder is located at the first workpiece loading/unloading zone and a second sealing panel which sealingly mates with a second sealing portion of the first section when the first workpiece holder is located in the first work zone.

The housing may further include a second section having a second opening through which workpieces pass into and out of the inner cavity. The system may further include a second workpiece positioner for alternately moving workpieces from a second workpiece loading/unloading zone, through the second opening to a second work zone within the inner cavity. The second workpiece positioner includes a second workpiece holder adapted to releasably receive at least one of the workpieces. The second workpiece holder is movable between the second workpiece loading/unloading zone and the second work zone as the second positioner moves between a second loading/unloading position and a second work position. The second positioner further includes a third sealing panel which sealingly mates with a third sealing portion of the second section when the second workpiece holder is located at the second workpiece loading/unloading zone and a fourth sealing panel which sealingly mates with a fourth sealing portion of the second section when the second workpiece holder is located in the second work zone.

Accordingly, it is an object of the present invention to provide an improved protective enclosure for encasing a workstation. It is a further object of the present invention to provide an improved laser sealing enclosure for encasing a laser workstation. It is another object of the present invention to provide an improved passive sealing arrangement for a laser enclosure. It is yet a further object of the present invention to provide an improved laser enclosure having a workpiece positioner for alternately moving workpieces from a workpiece loading/unloading zone, through an opening in the enclosure housing to a work zone within the housing inner cavity. It is yet another object of the present invention to provide an improved laser enclosure having first and second separate workpiece positioners. These and other objects and advantages of the present invention will be apparent from the following description, the accompanying drawings and the appended claims.

BRIEF DESCRIPTION OF THE DRAWINGS

FIG. 2 is a perspective view of the first workpiece positioner removed from the first wall of the enclosure housing;

FIG. 3 is a perspective view of the first vertical wall of the enclosure housing with all of the first workpiece positioner removed save for a first portion of the shaft which is shown in phantom and an end portion positioned in a bearing;

DETAILED DESCRIPTION OF THE INVENTION

Figure 1:
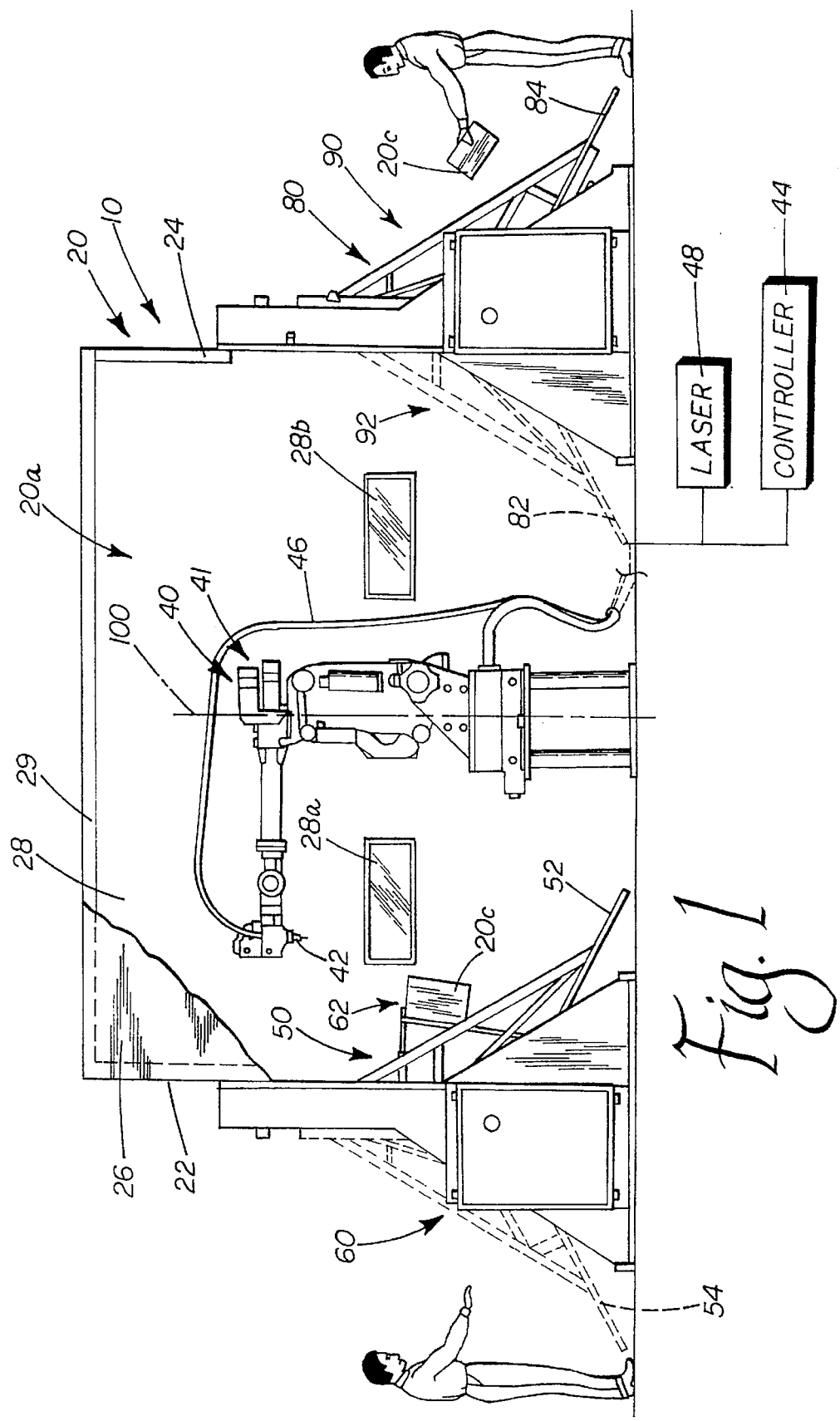
FIG. 1 is a side view of a protective enclosure constructed in accordance with the present invention with a portion of the housing removed.

Reference is now made to FIG. 1, which illustrates a protective laser enclosure system 10 constructed in accordance with the present invention. The enclosure system 10 includes a housing 20 having first, second, third and fourth generally vertical walls 22, 24, 26 and 28, respectively. A stationary ceiling 29 is fixedly connected to the first, second, third and fourth walls 22, 24, 26 and 28. The fourth wall 28, in the illustrated embodiment, includes filtered viewing ports 28a and 28b.

The housing 20 includes an inner cavity 20a containing a device 40 for cutting or welding workpieces 20c. The device 40 comprises, in the illustrated embodiment, an articulated arm robot 41 (see, e.g., U.S. Pat. No. 4,884,189, the disclosure of which is hereby incorporated by reference) having a Nd:YAG continuous wave (CW) cutting head 42. The robot 41 is controlled via a system controller 44. Such a robot 41 is commercially available from Motoman Inc. under any one of the trademarks Motoman® K10S, K10ASB, or K60A robot. The controller 44 is likewise commercially available from Motoman Inc. A fiber optic cable 46 connects the cutting head 42 with a conventional Nd:YAG laser 48. The device 40 may alternatively comprise any machine used in welding, such as a $CO_2$ laser device or an electric-arc welding device.

Figure 2B:
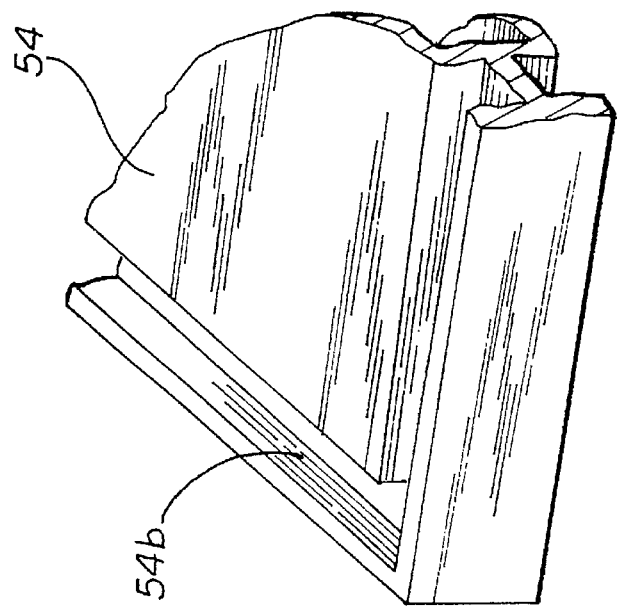
FIGS. 2a and 2b show corner portions of the first and second sealing panels shown in FIG. 2.
Figure 2A:
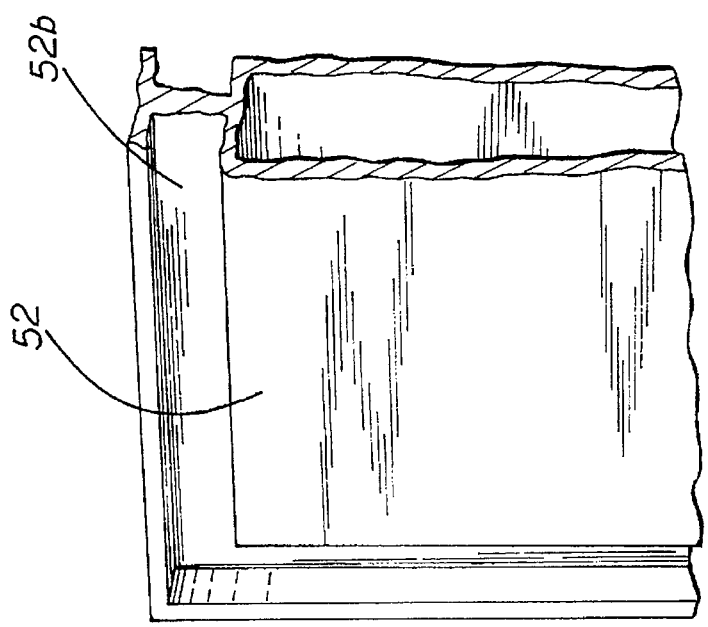
Figure 3B:
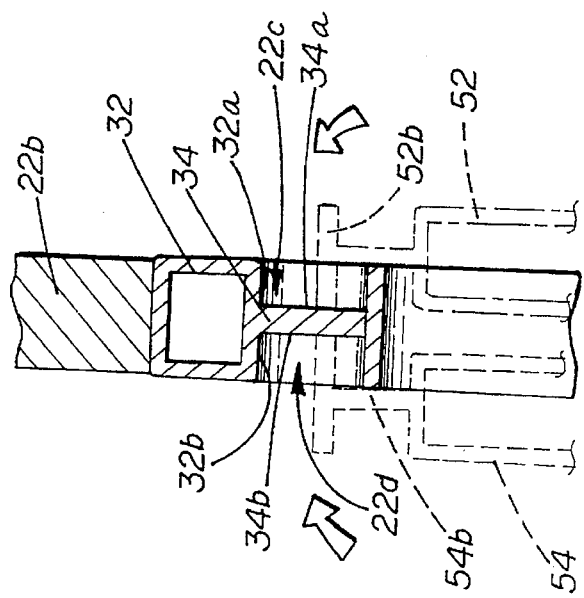
FIG. 3b is a cross-sectional side view of a portion of the sealing structure in FIG. 3 and, in phantom, the first and second sealing panels are shown in sealing engagement with the sealing structure.
Figure 3A:
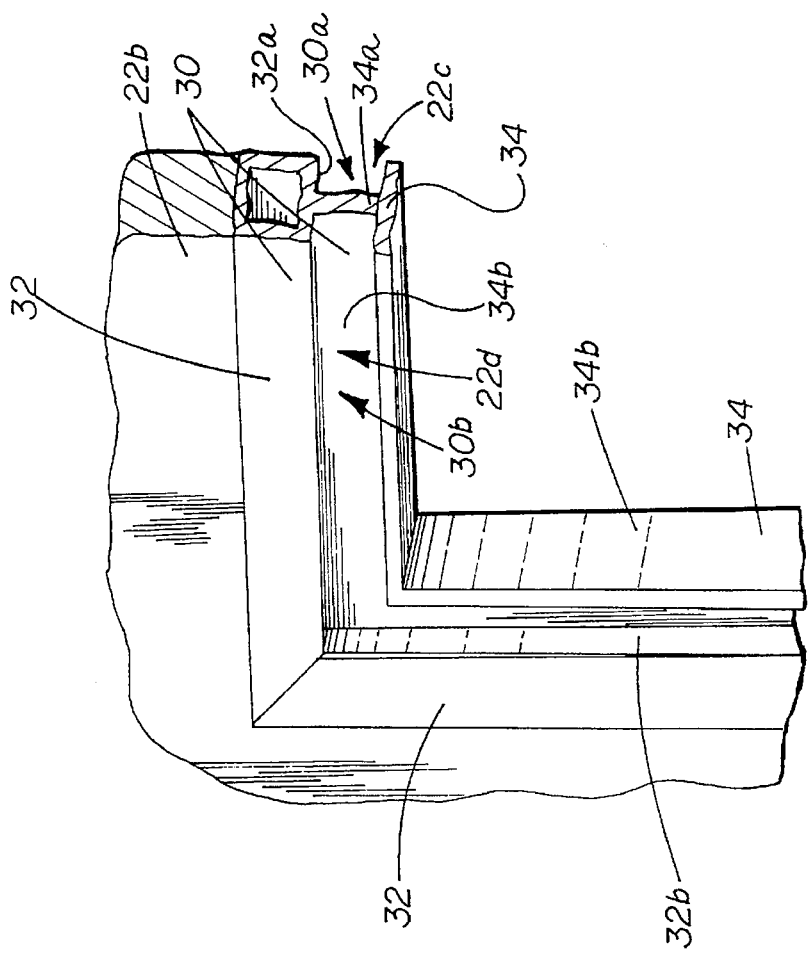
FIG. 3a shows a portion of the sealing structure shown in FIG. 3.

Referring now to FIGS. 2 and 3, the first wall 22 (also referred to herein as the first section) includes a first opening 22a through which workpieces 20c pass into and out of the inner cavity 20a. The first wall 22 includes first sealing structure 30 which is fixedly secured to a remaining portion 22b of the first wall 22, see also FIGS. 3a, and 3b. The first sealing structure 30 defines the first opening 22a.

Figure 4:
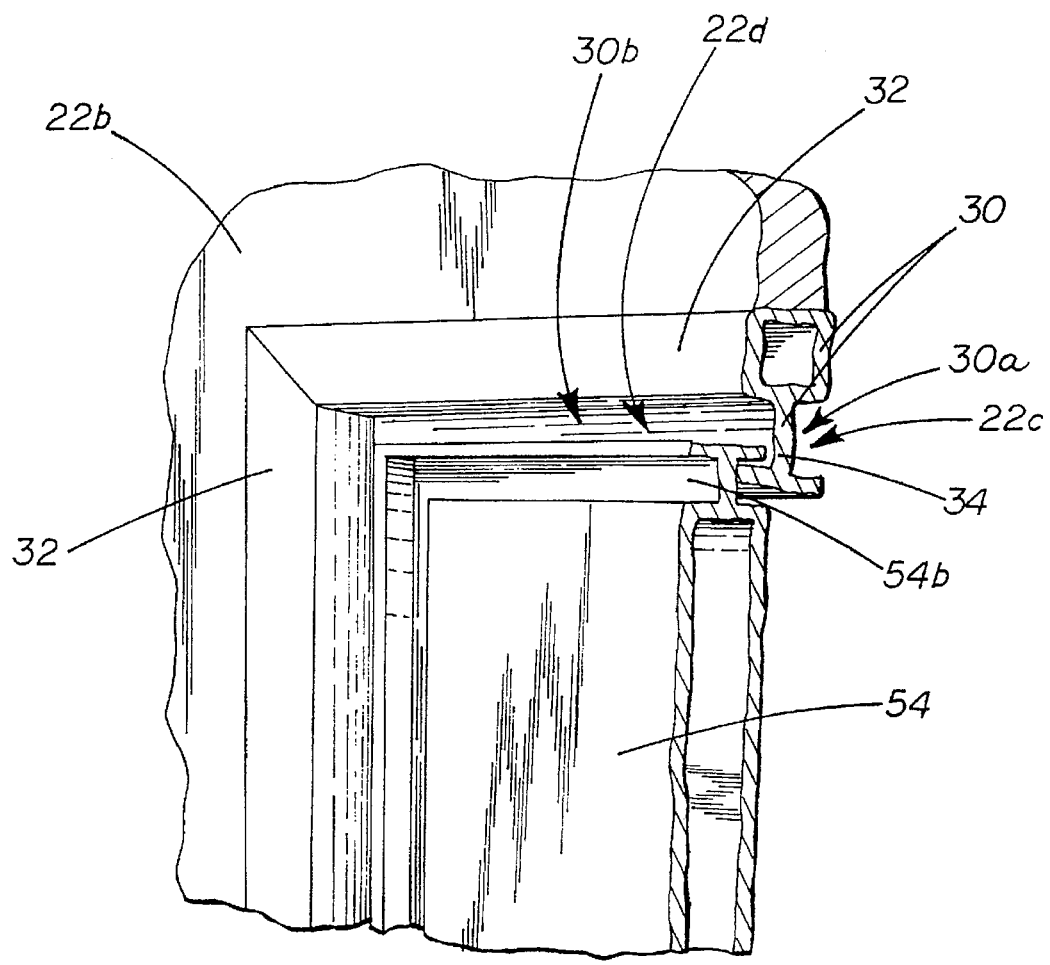
FIG. 4 shows a portion of the second sealing panel in sealing engagement with a portion of the sealing structure.

The first sealing structure 30 comprises, in the illustrated embodiment, a plurality of first members 32 and second members 34, see FIGS. 3a, 3b, and 4. Each of the first members 32 has a generally rectangular shape in cross section and is fixedly secured to the remaining portion 22b of the first wall 22. Each of the second members 34 is generally T-shaped in cross section and is weldedly or otherwise fixedly secured to a corresponding one of the first members 32. Inner surfaces 32a and 34a of the first and second members 32 and 34 combine to form a first inner surface 30a of the first sealing structure 30 which defines a first sealing portion 22c of the first wall 22. Outer surfaces 32b and 34b of the first and second members 32 and 34 combine to form a first outer surface 30b of the first sealing structure 30 which defines a second sealing portion 22d of the first wall 22.

The second wall 24 (also referred to herein as the second section) is constructed in essentially the same manner as the first wall 22. It is provided with a second opening 24a through which workpieces 20c pass into and out of the inner cavity 20a, see FIGS. 6a and 6b. The second wall 24 includes second sealing structure 35 which is fixedly secured to a remaining portion 24b of the second wall 24. The second sealing structure 35 defines the second opening 24a.

The second sealing structure 35 comprises, in the illustrated embodiment, a plurality of first members 37 and second members 39. Each of the first members 37 has a generally rectangular shape in cross section and is fixedly secured to the remaining portion 24b of the second wall 24. Each of the second members 39 is generally T-shaped in cross section and is weldedly or otherwise fixedly secured to a corresponding one of the first members 37. Inner surfaces of the first and second members 37 and 39 combine to form a second inner surface of the second sealing structure 35 which defines a third sealing portion 24c of the second wall 24. Outer surfaces of the first and second members 37 and 39 combine to form a second outer surface of the second sealing structure 35 which defines a fourth outer sealing portion 24d of the second wall 24.

Further provided is a first workpiece positioner 50 for alternately moving workpieces 20c from a first workpiece loading/unloading zone 60, through the first opening 22a to a first work zone 62 within the inner cavity 20a of the housing 20, see FIG. 1. The first workpiece positioner 50 includes first and second sealing panels 52 and 54, a rotatable shaft 56 and a generally rectangular cross member 58, see FIGS. 2, 5a and 5b. The rotatable shaft 56 extends through the cross member 58 and the cross member 58 is fixedly attached to the shaft 56 so as to rotate therewith. The shaft 56 is rotatably supported via conventional bearings 56a, see FIG. 3. A drive motor (not shown) is operatively connected to the shaft 56 for effecting rotation of the shaft 56 and hence the cross member 58 back and forth through an angle of approximately 120°. The second panel 54 is fixedly connected to the cross member 58 via a plurality of connecting members 54a. The first panel 52 is connected to the second panel 54 via a plurality of elongated support members 52a so as to move with the shaft 56 and the second panel 54. As can be seen from FIGS. 2, 5a and 5b, the first and second panels 52 and 54 are separated from one another by an angle of approximately 120°.

The first workpiece positioner 50 further includes a first workpiece holder 70 for releasably receiving a workpiece 20c. The first workpiece holder 70, in the illustrated embodiment, comprises a workpiece fixture 72 and two piston/cylinder units 74, which are fixedly connected at their first ends 74a to the second panel 54 via conventional fasteners (not shown) and at their second ends 74b to the fixture 72 via conventional fasteners (not shown). The piston/cylinder units 74, when actuated via the controller 44, cause the fixture 72 to pivot about a shaft 76, which is rotatably supported on the first panel 52 via support members 78, see FIGS. 2 and 5b. The first workpiece holder 70 is movable from the first workpiece loading/unloading zone 60 to the first work zone 62 as the first workpiece positioner 50 moves from a first loading/unloading position, shown in FIG. 5a and in phantom in FIG. 1, to a first work position, shown in FIG. 5b and in solid line in FIG. 1.

The first sealing panel 52 includes a T-shaped outer edge 52b which extends completely about its outer periphery, see FIG. 2a. Similarly, the second sealing panel 54 includes a T-shaped outer edge 54b which extends completely about its outer periphery, see FIG. 2b.

The first workpiece positioner 50 functions in the following manner. With the workpiece positioner 50 located in its loading/unloading position, shown in FIG. 5a, a workpiece 20c is fixedly mounted to the fixture 72 via conventional attachment means (not shown). The workpiece 20c may comprise, for example, an automotive or truck body panel. The drive motor effects rotation of the shaft 56 through an angle of approximately 120° (in a clockwise direction as viewed in FIGS. 1 and 5a) such that workpiece positioner 50 is caused to move to its work position, shown in FIG. 5b. The piston/cylinder units 74 are actuated to pivot the fixture 72 about the shaft 76 so that the workpiece 20c moves toward the robot 41 and away from the second panel 54, see FIG. 5b.

When the workpiece positioner 50 is in its work position, the T-shaped outer edge 54b of the second sealing panel 54 engages the second sealing portion 22d of the first wall 22 so as to sealingly mate the second panel 54 with the first wall 22, see FIGS. 3b and 4. The mating of the second panel 54 with the first wall 22 inhibits the escape of laser energy through the first opening 22a during the laser operation involving the workpiece 20c mounted to the fixture 72.

Figure 5A:
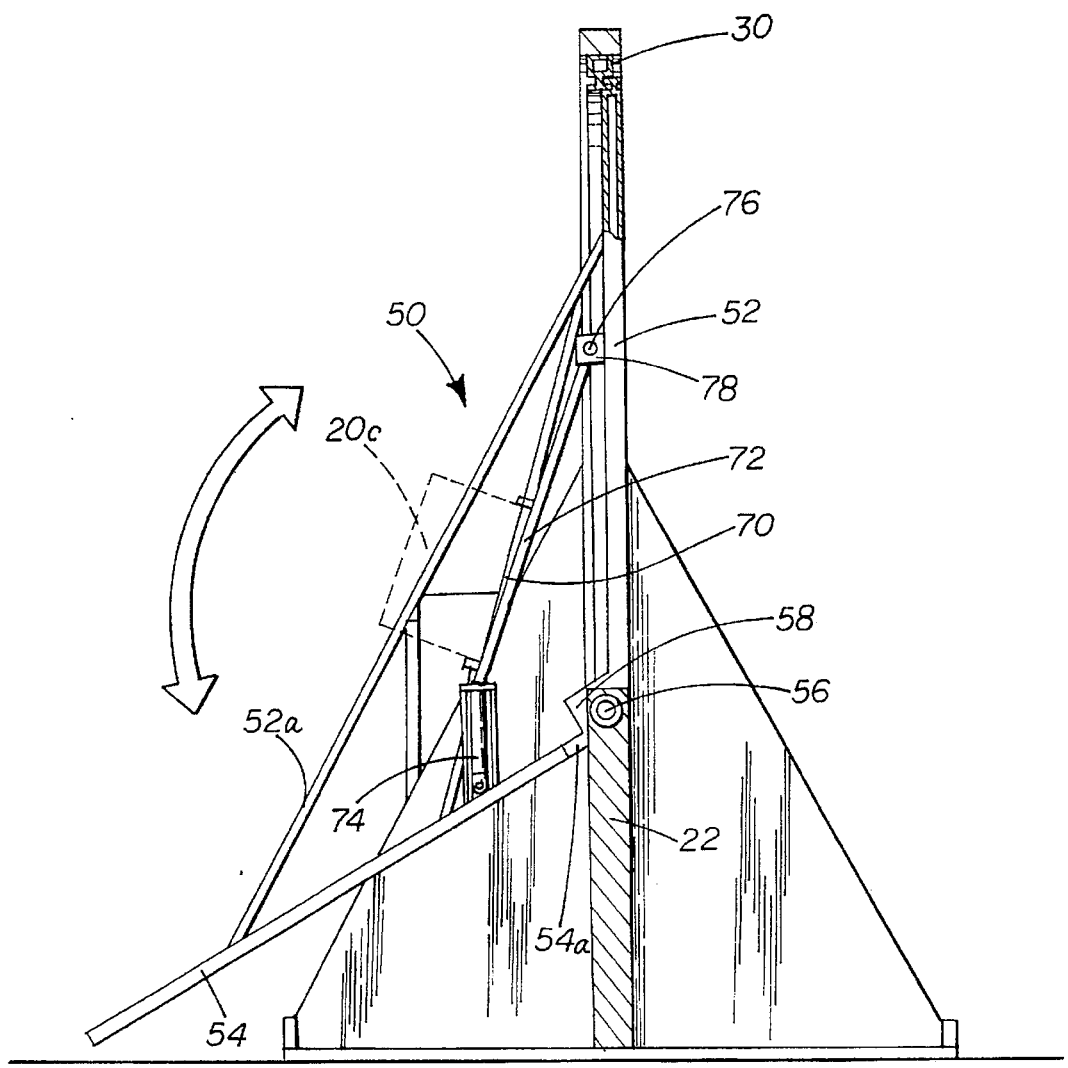
FIG. 5a shows somewhat schematically the first workpiece positioner, partially in cross section, in its first loading/ unloading position and only the first wall of the housing.
Figure 5B:
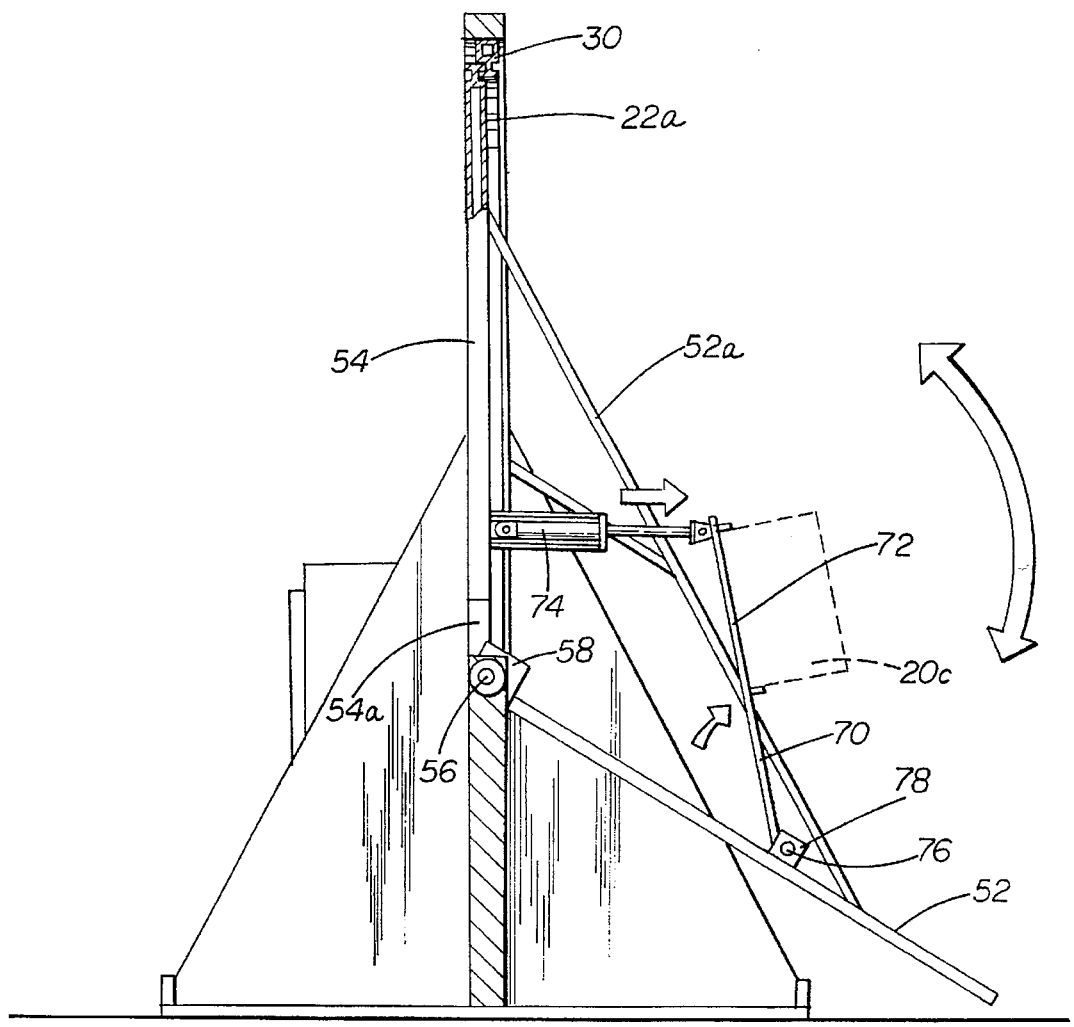
FIG. 5b shows somewhat schematically the first workpiece positioner, partially in cross section, in its first work position and only the first wall of the housing.

After the laser operation has been completed, the drive motor is caused to effect rotation of the shaft 56 in a reverse direction (in a counter-clockwise direction as viewed in FIGS. 1 and 5b) such that the positioner 50 moves back to its loading/unloading position, shown in FIG. 5a. When in this position, the finished workpiece 20c is removed from the fixture 72 and an unfinished workpiece 20c is attached in its place. Also, when the workpiece positioner 50 is in its loading/unloading position, the T-shaped outer edge 52b of the first sealing panel 52 engages the first sealing portion 22c of the first wall 22 so as to sealingly mate the first panel 52 with the first wall 22, see FIG. 3b.

Figure 6A:
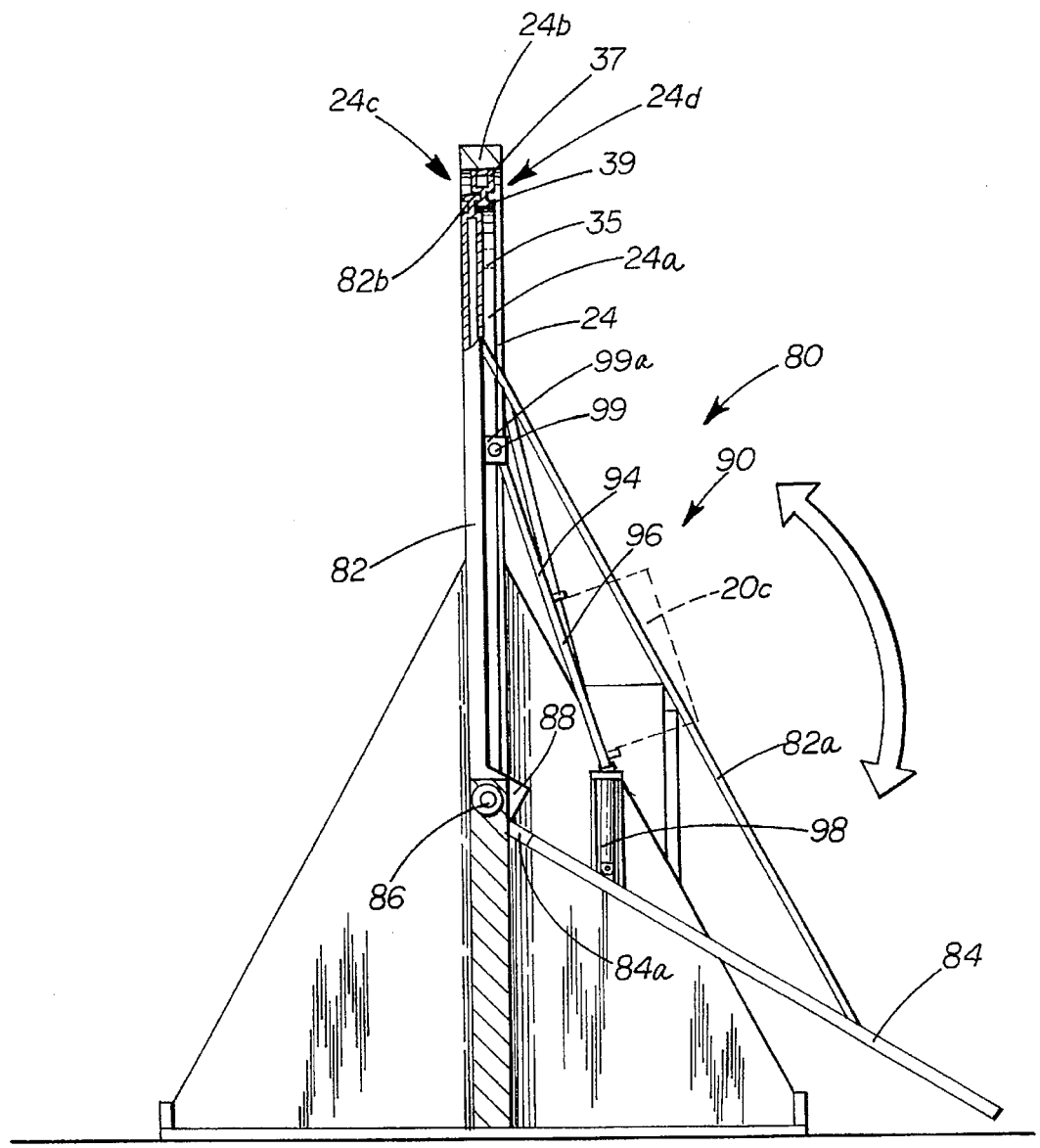
FIG. 6a shows somewhat schematically the second workpiece positioner, partially in cross section, in its second loading/unloading position and only the second wall of the housing.
Figure 6B:
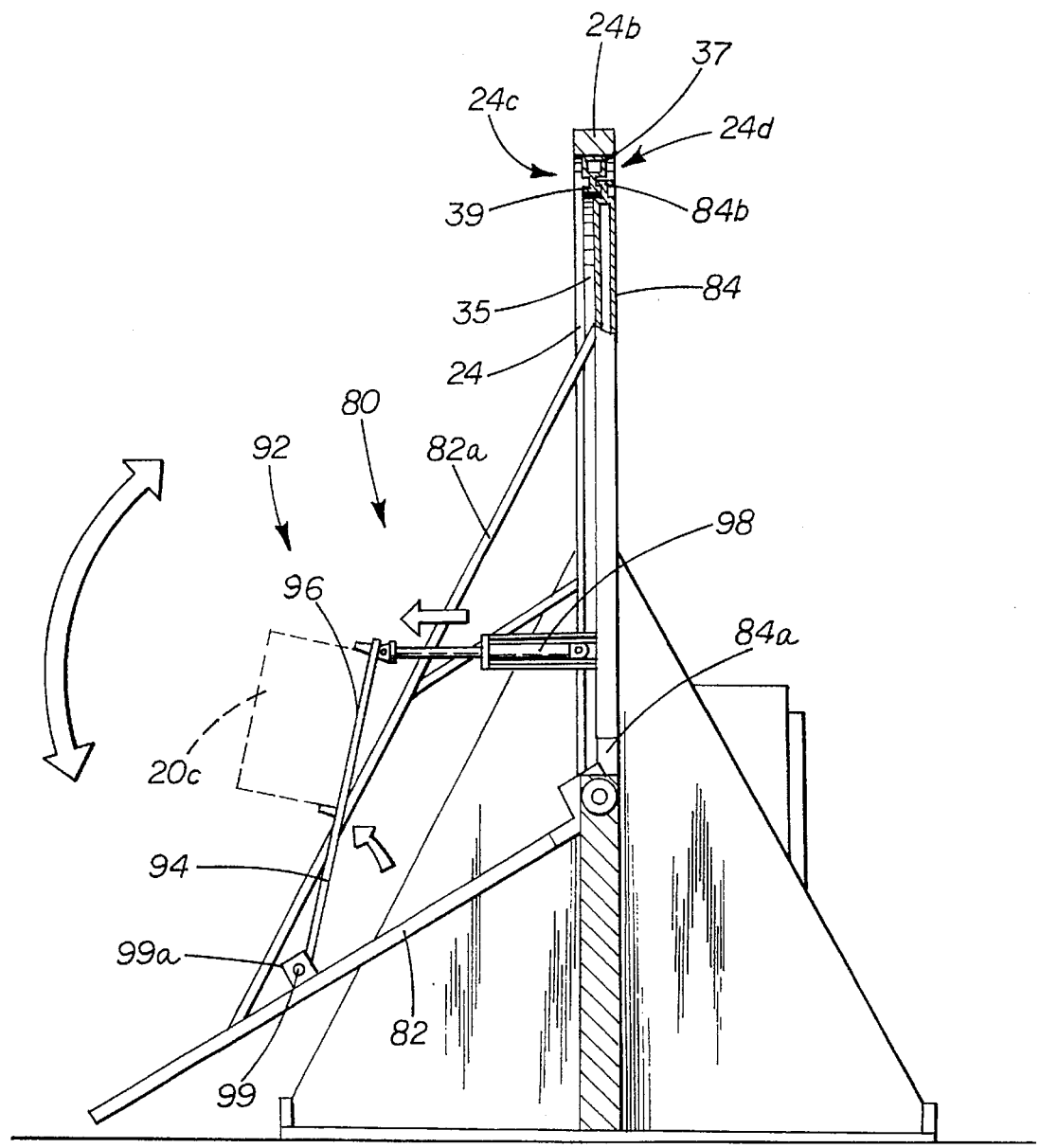
FIG. 6b shows somewhat schematically the second workpiece positioner, partially in cross section, in its second work position and only the second wall of the housing.

The laser enclosure system 10 further includes a second workpiece positioner 80 for alternately moving workpieces 20c from a second workpiece loading/unloading zone 90, through the second opening 24a to a second work zone 92 within the inner cavity 20a of the housing 20, see FIGS. 1, 6a and 6b. The second workpiece positioner 80 includes third and fourth sealing panels 82 and 84, a rotatable shaft 86 and a generally rectangular cross member 88. The rotatable shaft 86 extends through the cross member 88 and the cross member 88 is fixedly attached to the shaft 86 so as to rotate therewith. The shaft 86 is rotatably supported via conventional bearings (not shown). A drive motor (not shown) is connected to the shaft 86 for effecting rotation of the shaft 86 and hence the cross member 88 back and forth through an angle of approximately 120°. The fourth panel 84 is fixedly connected to the cross member 88 via a plurality of connecting members 84a. The third panel 82 is connected to the fourth panel 84 via a plurality of elongated support members 82a. The third and fourth panels 82 and 84 are separated from one another by an angle of approximately 120°.

The second workpiece positioner 80 further includes a first workpiece holder 94 which is adapted to releasably receive a workpiece 20c and securely hold that workpiece 20c during a laser operation. The second workpiece holder 94 is constructed in essentially the same manner as the first workpiece holder 70 and comprises a workpiece fixture 96 and two piston/cylinder units 98 which cause the fixture 96 to pivot about shaft 99 which is fixed via support members 99a to the third panel 82. The second workpiece holder 94 moves from the second workpiece loading/unloading zone 90 to the first work zone 92 as the second workpiece positioner 80 moves from a second loading/unloading position, shown in FIG. 6a, to a second work position, shown in FIG. 6b.

Each of the third and fourth sealing panels 82 and 84 includes a T-shaped outer edge 82b and 84b, respectively, which extends completely about its outer periphery, see FIGS. 6a and 6b.

Operation of the second workpiece positioner 80 occurs in the following manner. A workpiece 20c is attached to the fixture 96 when the workpiece positioner 80 is in its loading/unloading position, shown in FIG. 6a. The drive motor (not shown) effects rotation of the shaft 86 such that workpiece positioner 80 is moved to its work position, shown in FIG. 6b. The piston/cylinder units 98 are actuated causing the fixture 96 to rotate about shaft 99 to move the workpiece 20c toward the robot 41 and away from the fourth panel 84. When the workpiece positioner 80 is in its work position, the T-shaped outer edge 84b of the fourth sealing panel 84 engages the fourth sealing portion 24d of the second wall 24 so as to sealingly mate the fourth panel 84 to the second wall 24. The mating of the fourth panel 84 to the second wall 24 inhibits the escape of laser energy through the second opening 24a during the laser operation involving the workpiece 20c mounted to the fixture 96.

After the laser operation has been completed, the drive motor again effects rotation of the shaft 86 causing the positioner 80 to move back to its loading/unloading position, shown in FIG. 6a. When in this position, the finished workpiece can be removed from the fixture 96 and an unfinished workpiece can be attached in its place. Also, when the workpiece positioner 80 is in its loading/unloading position, the T-shaped outer edge 82b of the third sealing panel 82 engages the third sealing portion 24c of the second wall 24 so as to sealingly mate the third panel 82 with the second wall 24, see FIG. 6a.

In the illustrated embodiment, the robot 41 is capable of rotating about a generally vertical axis 100, see FIG. 1, back and forth through an angle of approximately 340°. Accordingly, the robot 41 is capable of rotating the cutting head 42 back and forth between the first and second work zones 62 and 92 to alternately work on workpieces 20c attached to fixtures 72 and 96.

Operation of the laser enclosure system 10 occurs in the following manner. The first workpiece positioner 50, having a workpiece 20c secured to the fixture 72, is moved to its work position, shown in FIG. 5b. When the positioner 50 is in this position, the second sealing panel 54 sealingly mates with the first wall 22, as described above, to prevent laser energy from escaping through the first opening 22a during the laser operation involving the workpiece 20c secured to the fixture 72. Additionally, the second workpiece positioner 80 is positioned in its loading/unloading position, see FIG. 6a, such that the third sealing panel 82 sealingly mates to the second wall 24. With the third sealing panel 82 engaged with the second wall 24 in this manner, laser energy is prevented from escaping through the second opening 24a during the laser operation involving the workpiece 20c mounted to the fixture 72.

After the laser operation has been completed, the drive motor associated with the shaft 56 is caused to effect rotation of the shaft 56 in a reverse direction such that the positioner 50 is moved back to its loading/unloading position, see FIG. 5a. When in this position, the first panel 52 is sealingly mated to the first wall 22. Preferably, during rotation of the shaft 56, the motor associated with the shaft 86 causes the shaft 86 to rotate with shaft 56 such that the workpiece positioner 80 is moved to its work position, shown in FIG. 6b. When the workpiece positioner 80 is in this position, the fourth panel 84 sealingly mates with the second wall 24 to inhibiting the escape of laser energy through the second opening 24a during the laser operation involving the workpiece 20c mounted to the fixture 96.

The robot 41 moves the cutting head 42 to the second work zone 92, preferably concurrently with the rotation of the shafts 56 and 86, to allow the cutting head 42 to work on the workpiece 20c secured to the fixture 96. The first and second positioners 50 and 80 continue to move back and forth between their respective loading/unloading and work positions so as to permit the cutting head 42 to alternately work on workpieces 20c attached to fixtures 72 and 96 in the first and second work zones 62 and 92.

Having described the invention in detail and by reference to a preferred embodiment thereof, it will be apparent that modifications and variations are possible without departing from the scope of the invention as defined in the appended claims.

What is claimed is:

1. An enclosure comprising:
   a housing having an inner cavity in which laser operations are capable of being performed and including a first section having a first opening through which workpieces pass into and out of said inner cavity; and
   a first workpiece positioner for alternately moving said workpieces from a first workpiece loading/unloading zone, through said first opening to a first work zone within said inner cavity, said first workpiece positioner including a first workpiece holder adapted to releasably receive at least one of said workpieces and being movable from said first workpiece loading/unloading zone to said first work zone as said first positioner moves from a first loading/unloading position to a first work position, said first positioner further including a first sealing panel which sealingly mates with a first sealing portion of said first section when said first workpiece holder is located in said first workpiece loading/unloading zone and a second sealing panel which sealingly mates with a second sealing portion of said first section when said first workpiece holder is located in said first work zone and said first sealing panel is not in engagement with said first housing section.

2. An enclosure as set forth in claim 1, wherein said first section comprises a first generally vertical wall having said first opening therein and said housing further comprises second, third and fourth generally vertical walls, and a ceiling connected to said first, second, third and fourth walls.

3. An enclosure as set forth in claim 1, wherein said first section includes first sealing structure which circumscribes said first opening, said first sealing structure having a first inner surface which defines said first sealing portion and a first outer surface which defines said second sealing portion.

4. An enclosure as set forth in claim 1, wherein said first workpiece positioner further includes a first rotatable shaft, said first and second sealing panels being fixedly attached to said first rotatable shaft for rotation with said first rotatable shaft.

5. An enclosure as set forth in claim 4, wherein first and second panels are separated from one another by an angle of approximately 120°.

6. An enclosure as set forth in claim 4, wherein said first workpiece holder is fixedly positioned between said first and second panels.

7. An enclosure as set forth in claim 6, wherein said first workpiece holder comprises a first workpiece fixture and a first displacement device for moving said first workpiece fixture relative to said second panel.

8. An enclosure as set forth in claim 4, wherein said first workpiece positioner further includes a drive device associated with said first shaft for effecting rotation of said first shaft through an angle of approximately 120° such that said first positioner moves through an angle of approximately 120° as it moves back and forth between said first loading/unloading position and said first work position.

9. An enclosure as set forth in claim 1, wherein said housing further includes a second section having a second opening through which workpieces pass into and out of said inner cavity, said enclosure further including a second workpiece positioner for alternately moving said workpieces from a second workpiece loading/unloading zone, through said second opening to a second work zone within said inner cavity, said second workpiece positioner including a second workpiece holder adapted to releasably receive at least one of said workpieces and being movable from said second workpiece loading/unloading zone to said second work zone as said second positioner moves from a second loading/unloading position to a second work position, said second positioner further including a third sealing panel which sealingly mates with a third sealing portion of said second section when said second workpiece holder is located in said second workpiece loading/unloading zone and a fourth sealing panel which sealingly mates with a fourth sealing portion of said second section when said second workpiece holder is located in said second work zone.

10. An enclosure as set forth in claim 9, wherein said second section includes second sealing structure which circumscribes said second opening, said second sealing structure having a second inner surface which defines said third sealing portion and a second outer surface which defines said fourth sealing portion.

11. An enclosure as set forth in claim 9, wherein said second workpiece positioner further includes a second rotatable shaft, said third and fourth sealing panels being fixedly attached to said second rotatable shaft for rotation with said second rotatable shaft.

12. An enclosure as set forth in claim 11, wherein said third and fourth panels are separated from one another by an angle of approximately 120°.

13. An enclosure as set forth in claim 11, wherein said second workpiece holder comprises a second workpiece fixture and a second displacement device for moving said second workpiece fixture relative to said second shaft.

14. A laser system comprising:
   a generator for generating a laser beam and directing said laser beam onto a workpiece located in a work zone;
   a housing having an inner cavity and including a first section provided with a first opening through which workpieces pass into and out of said inner cavity; and
   a first workpiece positioner for alternately moving said workpieces from a first workpiece loading/unloading zone, through said first opening to a first work zone within said inner cavity, said first workpiece positioner including a first workpiece holder adapted to releasably receive at least one of said workpieces and being movable between said first workpiece loading/unloading zone and said first work zone as said first positioner moves between a first loading/unloading position and a first work position, said first positioner further including a first sealing panel which sealingly mates with a first sealing portion of said first section when said first workpiece holder is located in said first workpiece loading/unloading zone and a second sealing panel which sealingly mates with a second sealing portion of said first section when said first workpiece holder is located in said first work zone and said first sealing panel is not in engagement with said first housing section.

15. A laser system as set forth in claim 14, wherein said first section comprises a first generally vertical wall having said first opening therein and said housing further comprises second, third and fourth generally vertical walls, and a ceiling connected to said first, second, third and fourth walls.

16. A laser system as set forth in claim 14, wherein said first section includes first sealing structure which circumscribes said first opening, said first sealing structure having a first inner surface which defines said first sealing portion and a first outer surface which defines said second sealing portion.

17. A laser system as set forth in claim 14, wherein said first workpiece positioner further includes a first rotatable shaft, said first and second sealing panels being fixedly attached to said first rotatable shaft for rotation with said first rotatable shaft.

18. A laser system as set forth in claim 17, wherein first and second panels are separated from one another by an angle of approximately 120°.

19. A laser system as set forth in claim 14, wherein said housing further includes a second section having a second opening through which workpieces pass into and out of said inner cavity, said system further including a second workpiece positioner for alternately moving said workpieces from a second workpiece loading/unloading zone, through said second opening to a second work zone within said inner cavity, said second workpiece positioner including a second workpiece holder adapted to releasably receive at least one of said workpieces and being movable between said second workpiece loading/unloading zone and said second work zone as said second positioner moves between a second loading/unloading position and a second work position, said second positioner further including a third sealing panel which sealingly mates with a third sealing portion of said second section when said second workpiece holder is located in said second workpiece loading/unloading zone and a fourth sealing panel which sealingly mates with a fourth sealing portion of said second section when said second workpiece holder is located in said second work zone for inhibiting laser energy from exiting said housing through said second opening during a laser operation.

20. A laser system as set forth in claim 19, wherein said second section includes second sealing structure which circumscribes said second opening, said second sealing structure having a second inner surface which defines said third sealing portion and a second outer surface which defines said fourth sealing portion.

* * * * *